(12) United States Patent
Mochizuki et al.

(10) Patent No.: US 7,938,036 B2
(45) Date of Patent: May 10, 2011

(54) STRADDLE-TYPE VEHICLE

(75) Inventors: Kan Mochizuki, Shizuoka (JP); Takaaki Imamura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 209 days.

(21) Appl. No.: 11/616,101

(22) Filed: Dec. 26, 2006

(65) Prior Publication Data
US 2007/0144806 A1 Jun. 28, 2007

(30) Foreign Application Priority Data

Dec. 28, 2005 (JP) .................. 2005-377288
Jul. 31, 2006 (JP) .................. 2006-208045

(51) Int. Cl.
*F16H 59/00* (2006.01)
(52) U.S. Cl. .............. 74/335; 74/329; 180/219
(58) Field of Classification Search ........... 74/329, 74/335; 180/219
See application file for complete search history.

(56) References Cited

U.S. PATENT DOCUMENTS

| | | | | |
|---|---|---|---|---|
| 6,085,607 A * | 7/2000 | Narita et al. | ........ | 74/335 |
| 6,131,682 A * | 10/2000 | Walker | ........ | 180/219 |
| 6,857,334 B2 * | 2/2005 | Esly et al. | ........ | 74/335 |
| 7,575,083 B2 * | 8/2009 | Kosugi et al. | ........ | 180/219 |
| 2005/0217915 A1 * | 10/2005 | Kosugi et al. | ........ | 180/219 |

FOREIGN PATENT DOCUMENTS

| | | |
|---|---|---|
| JP | 2001-124203 | 5/2001 |
| JP | 2003-320861 | 11/2003 |

\* cited by examiner

*Primary Examiner* — Roger L Pang
*Assistant Examiner* — Derek D Knight
(74) *Attorney, Agent, or Firm* — Keating & Bennett, LLP

(57) ABSTRACT

A motorcycle in which the clutch on-off operation and the gear-shift operation of the transmission are automated that can be driven when the actuator fails without complication of the structure and upsizing of the power unit. A crankcase of a power unit accommodates a transmission including a plurality of gears, a gear-shift clutch that is engaged or disengaged at gear-shift operation, and a shift shaft that engages or disengages the clutch and provides gear change of the transmission. Part of the shift shaft projects from the crankcase. A projecting portion of the shift shaft and an output shaft of an actuator are connected together on the outside of the crankcase with a connecting device. The connecting device is detachably connected to the projecting portion of the shift shaft or the output shaft of the actuator.

17 Claims, 14 Drawing Sheets

[Fig. 1]
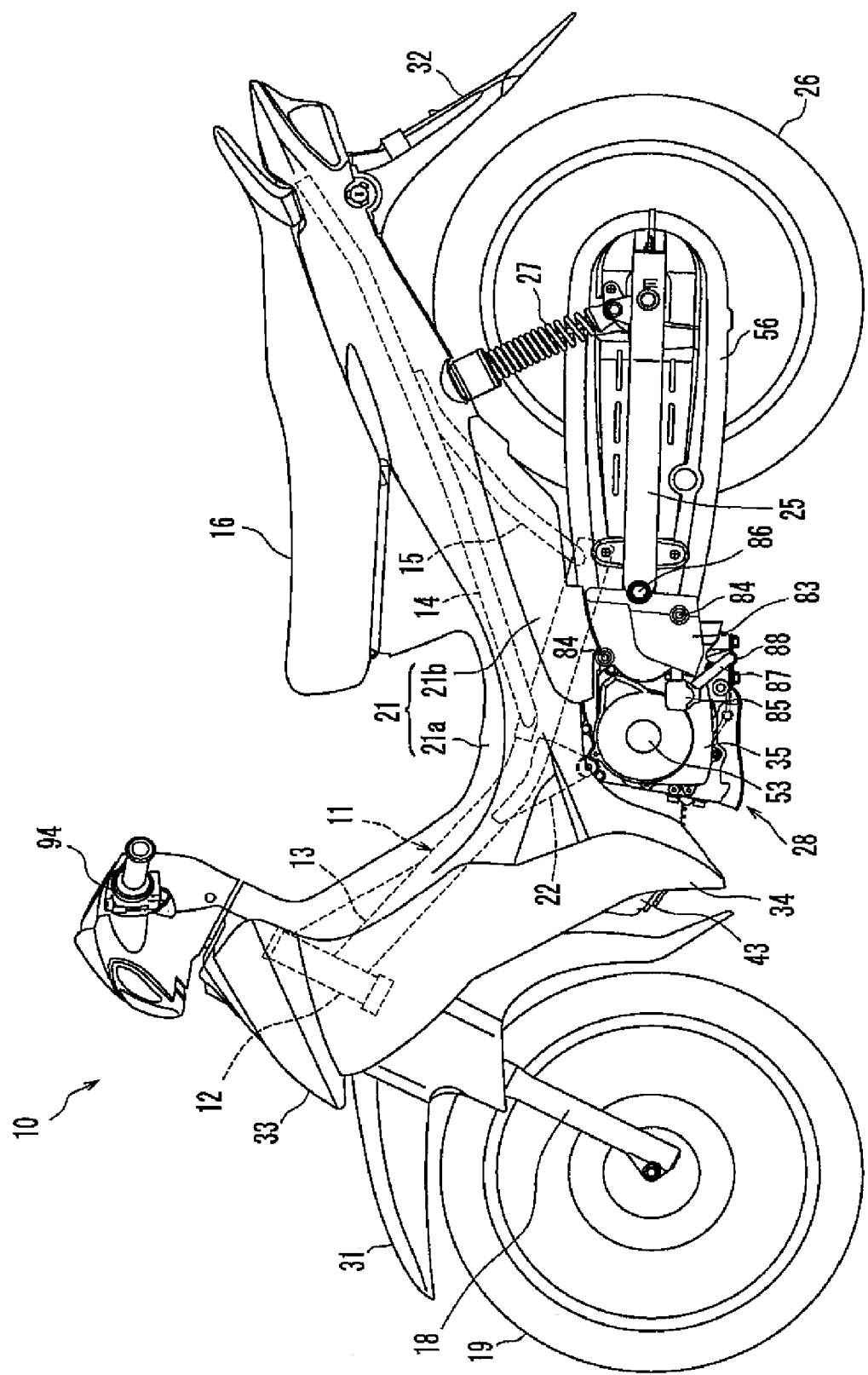

[Fig. 2]
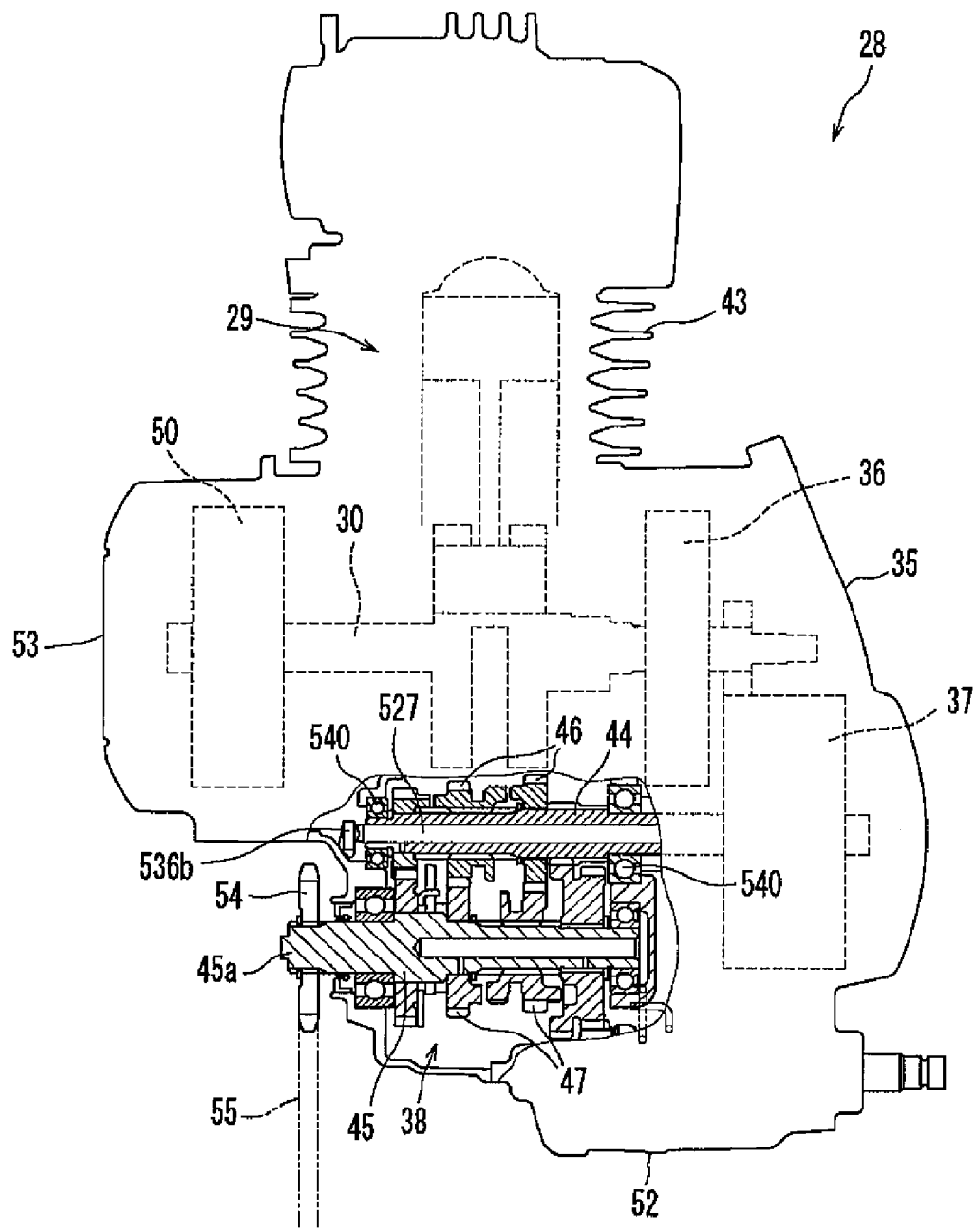

[Fig. 3]
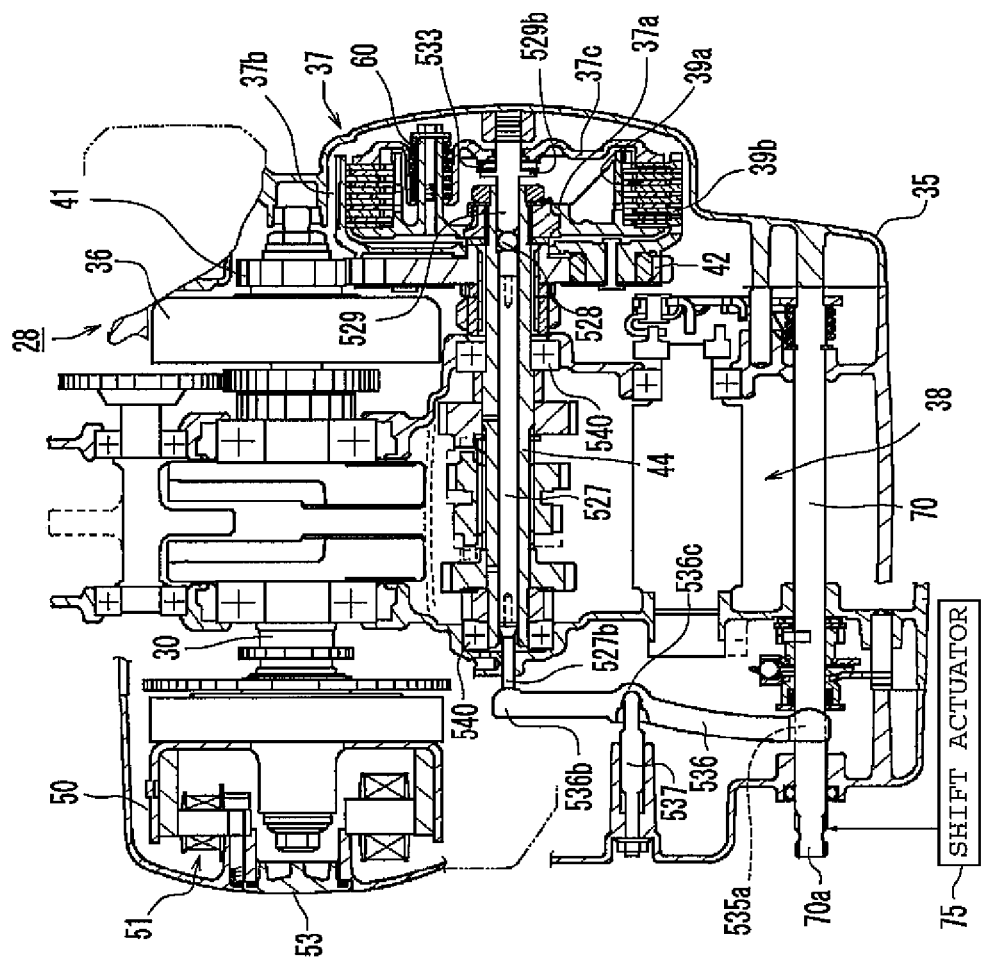

[Fig. 4]
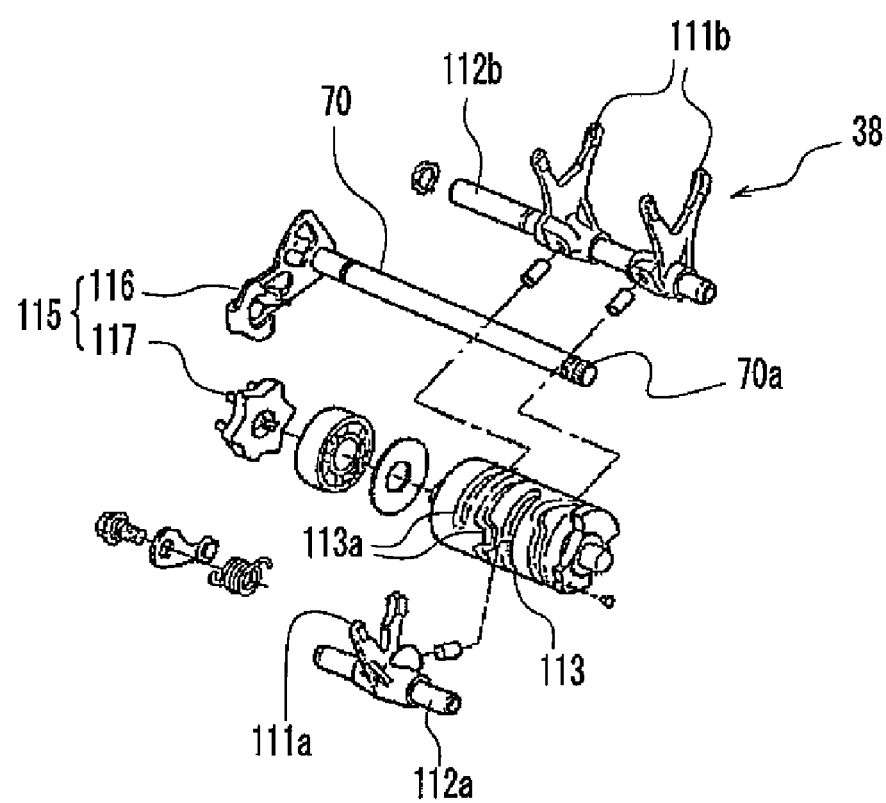

[Fig. 5]
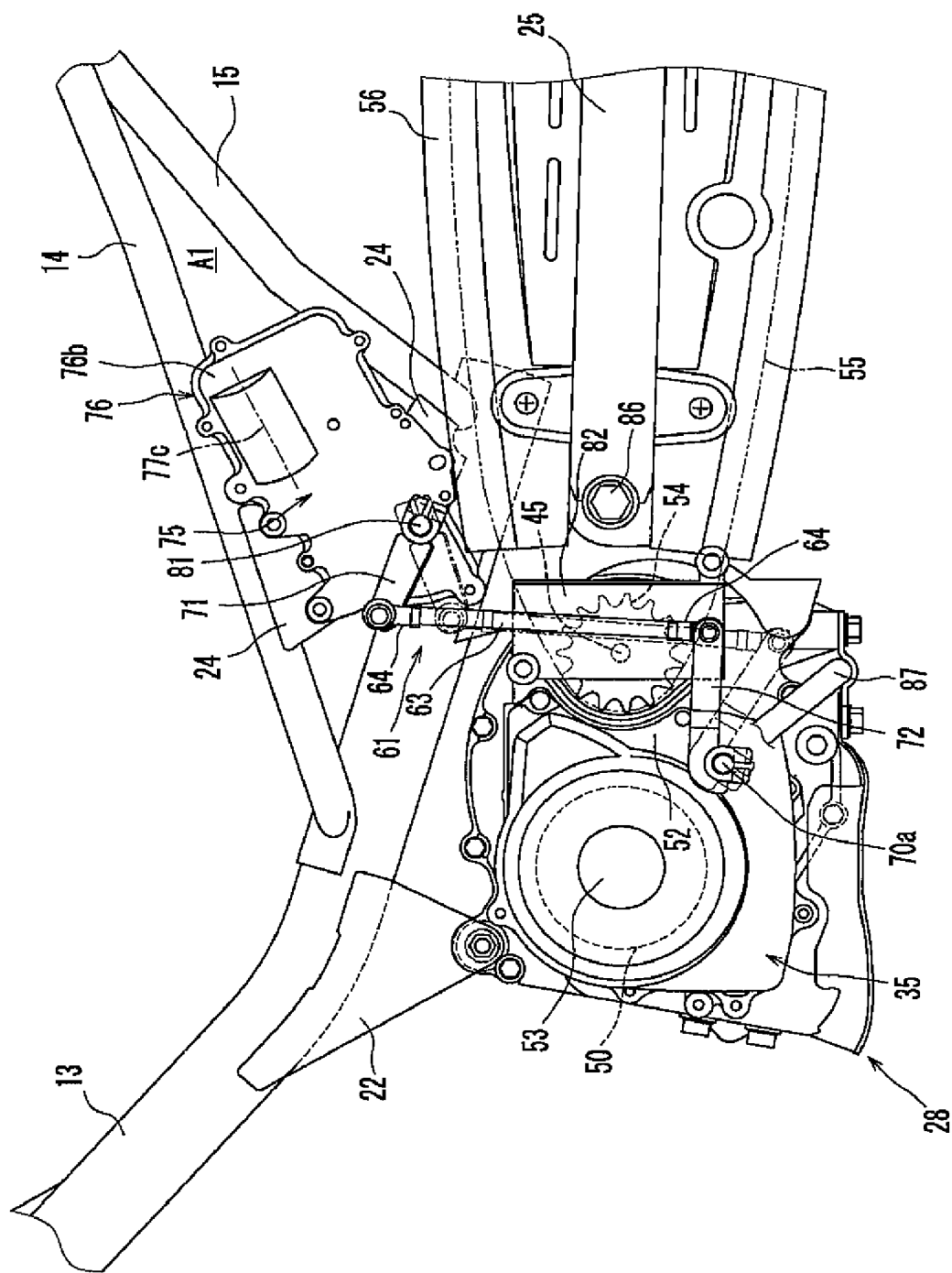

[Fig. 6]
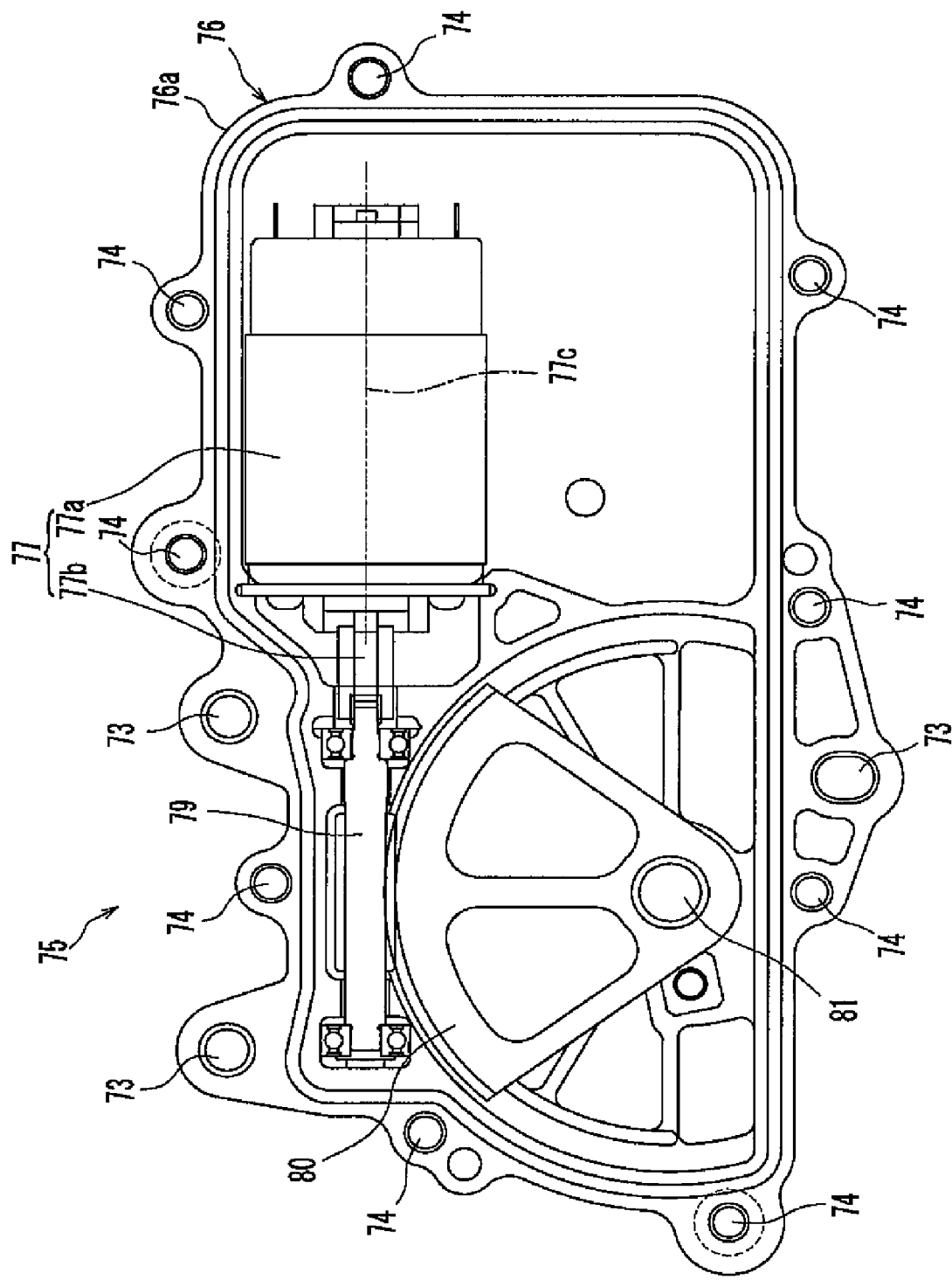

[Fig. 7]
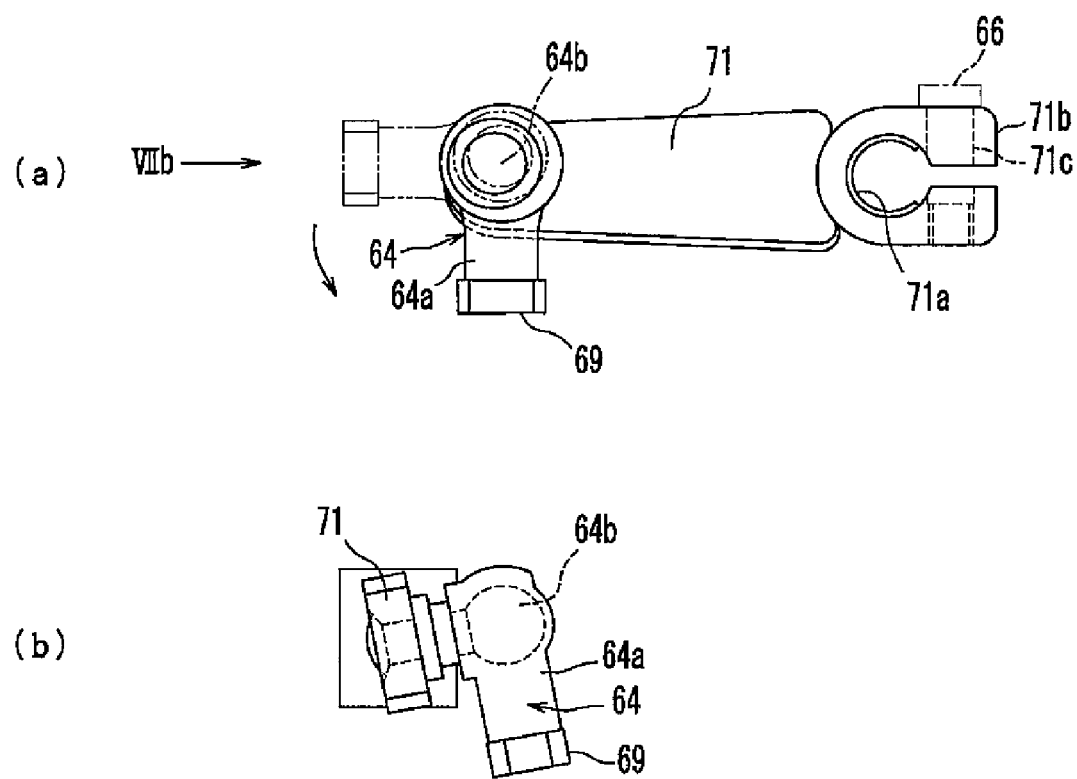

[Fig. 8]
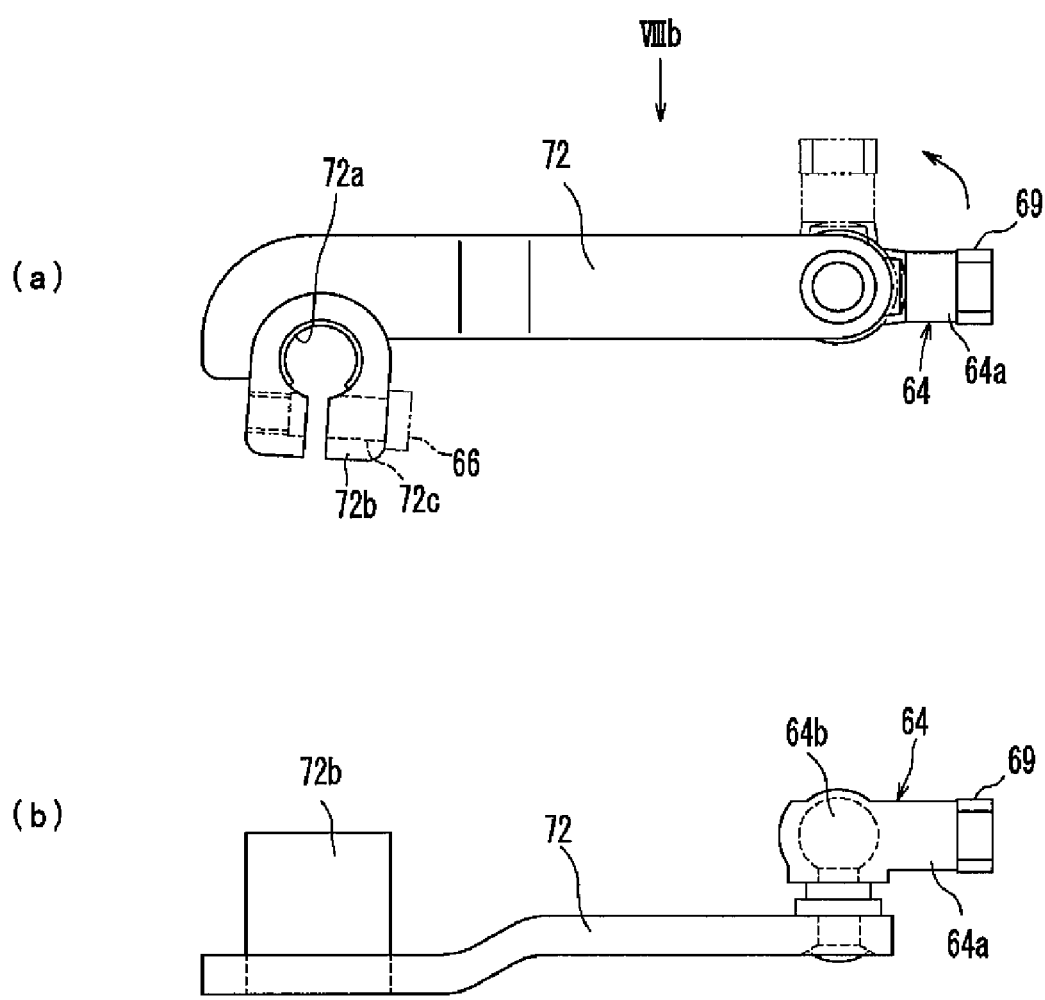

[Fig. 9]
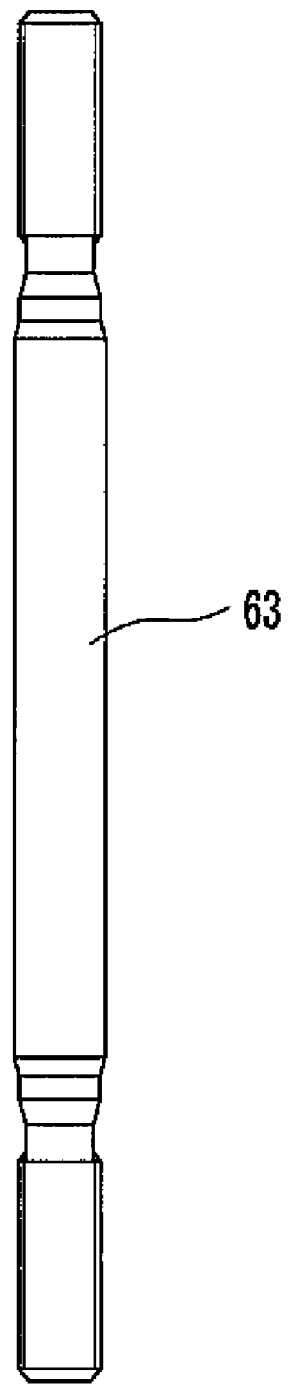

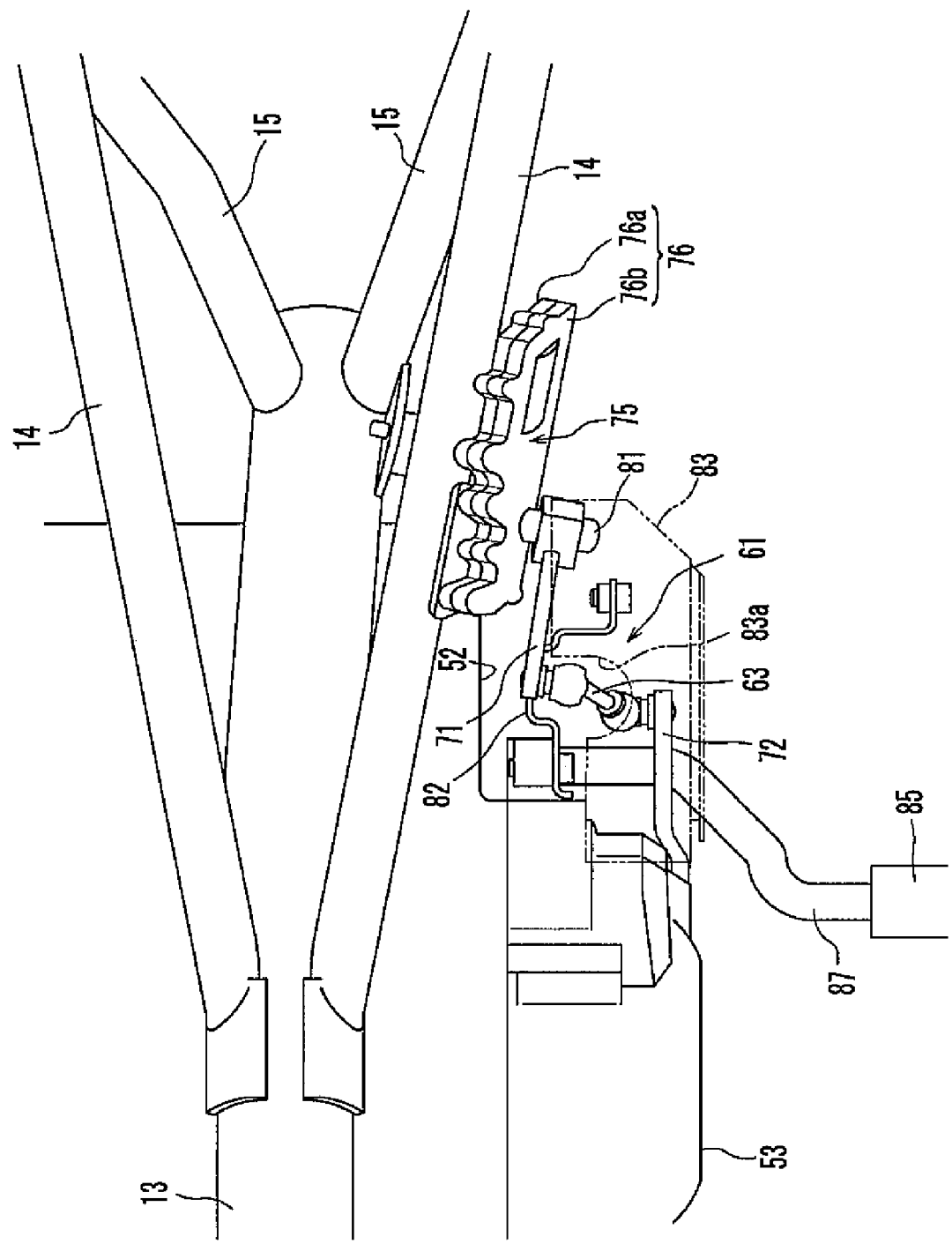

[Fig. 11]
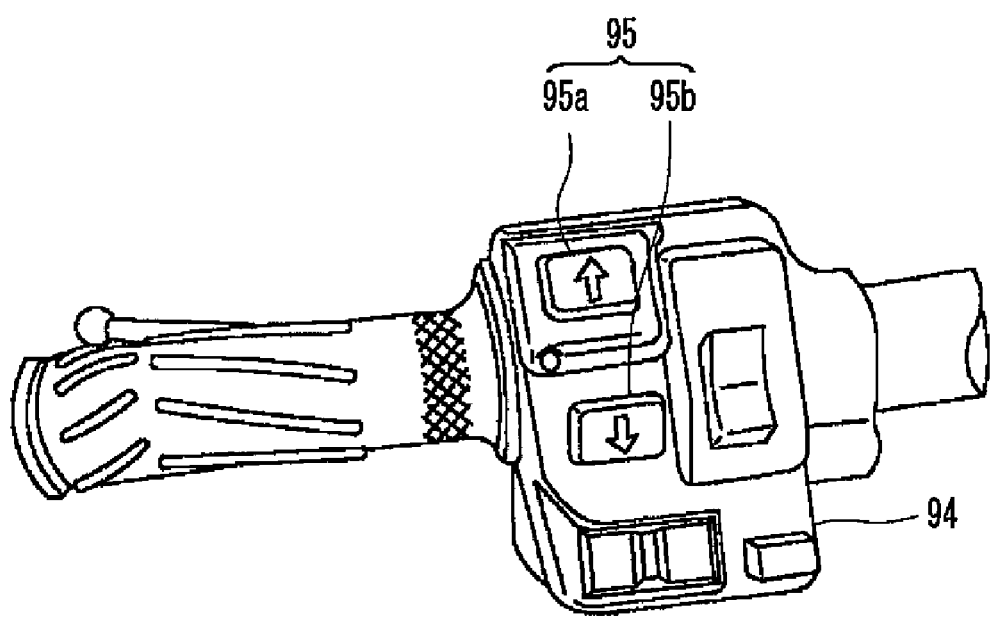

[Fig. 12]
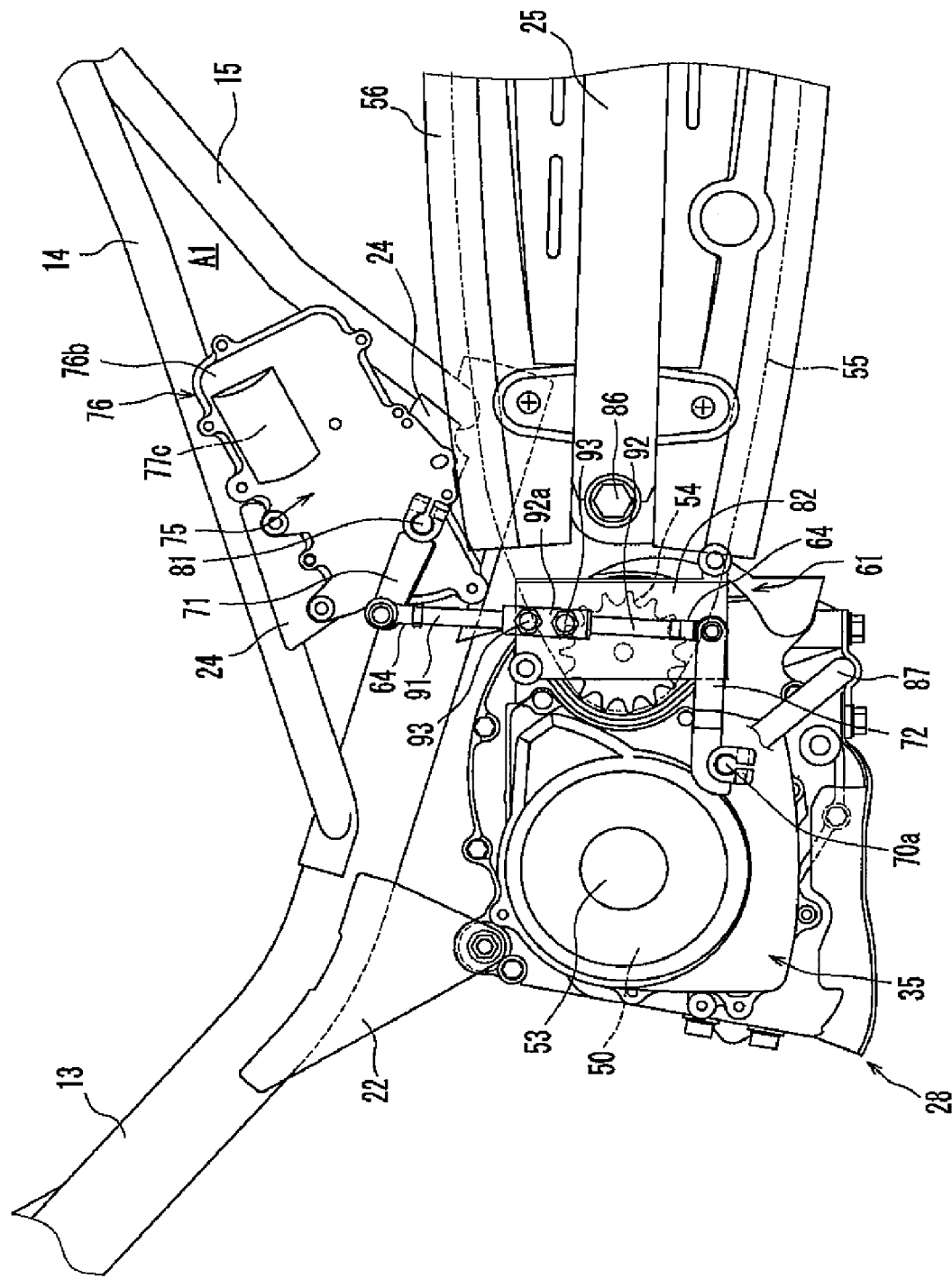

[Fig. 13]
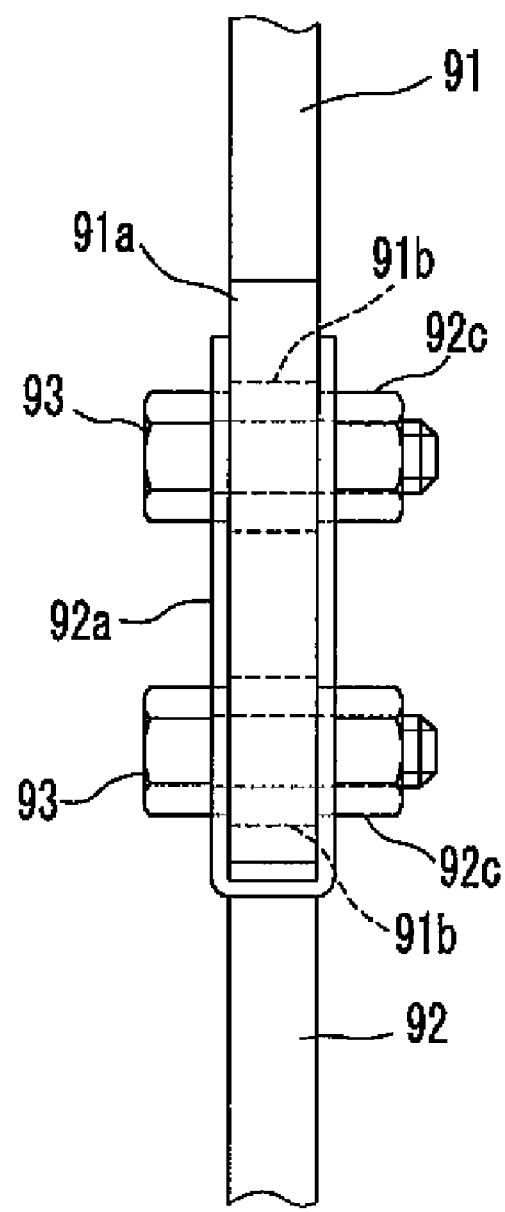

[Fig. 14]
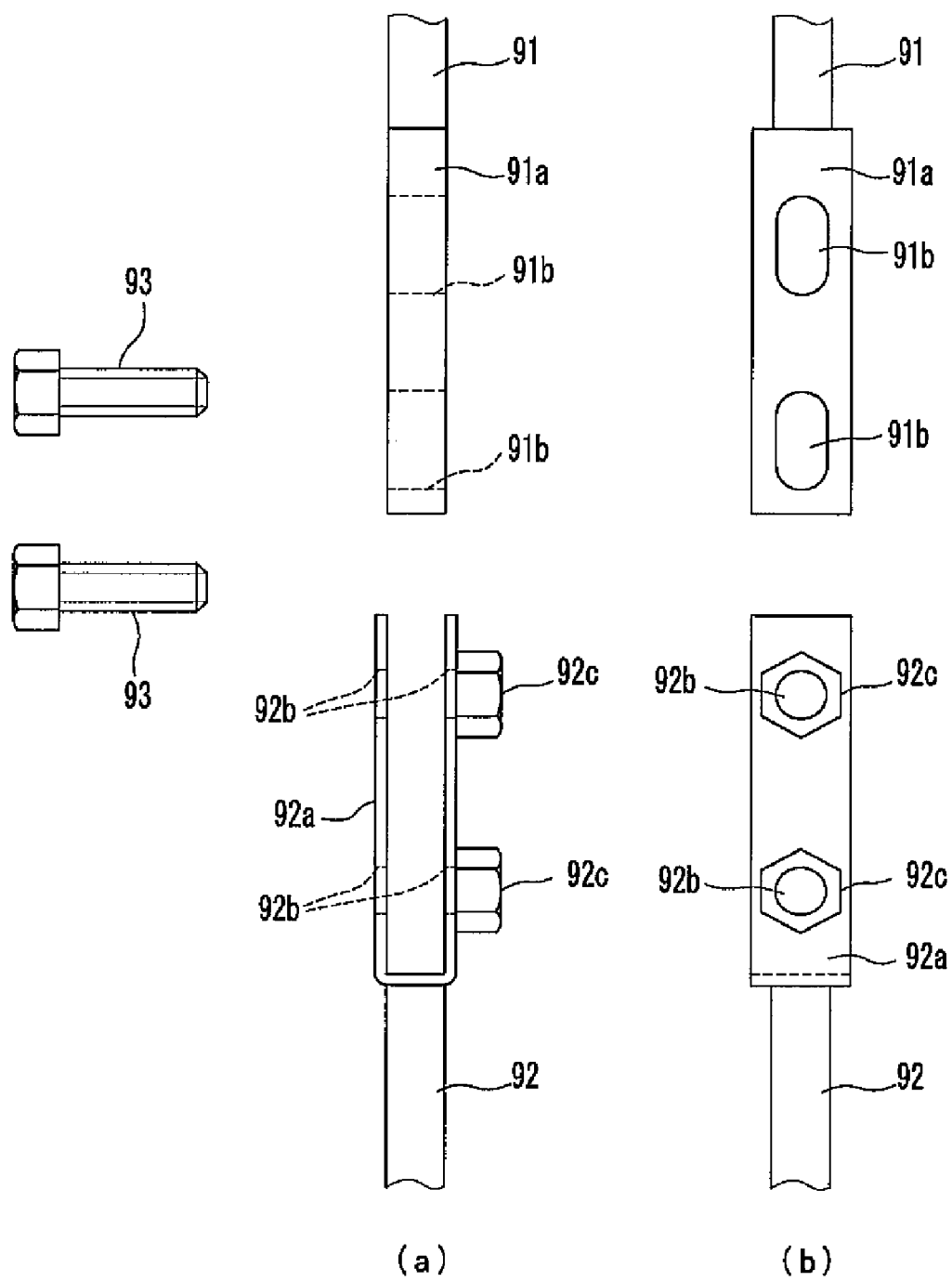
(a)  (b)

STRADDLE-TYPE VEHICLE

RELATED APPLICATIONS

This application claims the benefit of priority under 35 USC 119 of Japanese patent application no. 2005-377288, filed on Dec. 28, 2005, and Japanese patent application no. 2006-208045, filed on Jul. 31, 2006, which applications are hereby incorporated by reference in their entireties.

BACKGROUND OF THE INVENTION

1. Field of the Invention

The present invention relates to a saddle-type vehicle equipped with an automatic transmission.

2. Description of Related Art

Some known saddle-type vehicles are equipped with a transmission having a plurality of gears and a clutch that is engaged or disengaged at gear shift. Such vehicles may also have a clutch actuator for engaging or disengaging the clutch and a shifting actuator for actuating the gear-shift operation of the transmission so that the application and release of the clutch and the gear shift are automatically performed (see JP-A-2003-320861).

The clutch actuator and the shifting actuator are controlled to synchronize with each other. Thus, the clutch on-off operation and the gear-shift operation of the transmission are performed at an appropriate timing. Accordingly, if one of the actuators fails, it is impossible to synchronize the clutch on-off operation and the gear-shift operation of the transmission, thereby disabling gear shift and preventing the vehicle from being driven. However, even with a failed actuator, the rider will find it convenient if he/she can drive to a repair shop or the like.

Another known saddle-type vehicle uses the clutch actuator and the shifting actuator in common; that is, the clutch on-off operation and the gear-shift operation of the transmission are performed with one actuator. In this type of saddle-type vehicle, the clutch on-off operation and the gear-shift operation of the transmission are synchronized only by rotating the shift shaft. Accordingly, even if the actuator fails, shift change is possible provided that the shift shaft can be forced to rotate by some means. Consequently, this type of saddle-type vehicle can be driven at a desired shift position (for example, the first gear or the second gear) even with the actuator failed.

JP-A-2001-124203 discloses a motorcycle in which one of a motor change mode for driving the shift shaft by a motor and a manual change mode for manually driving the shift shaft can be selected. In this type of motorcycle, the shift shaft can be manually rotated by switching to the manual change mode, so that it can be driven even with a failed motor.

Thus, the saddle-type vehicle of JP-A-2003-320861 cannot be driven if the actuator fails. On the other hand, the motorcycle of JP-A-2001-124203 needs another mechanism for switching the mode, so that the power unit structure is complicated and large.

SUMMARY OF THE INVENTION

The present invention has been made in light of such circumstances, and enables driving of a saddle-type vehicle in which the clutch on-off operation and the gear-shift operation of the transmission are automated without complication of the structure and upsizing of the power unit.

A saddle-type vehicle according to the invention has a power unit including a transmission having a plurality of gears, a clutch that is engaged or disengaged at the gear-shift operation of the transmission, a shift shaft that engages or disengages the clutch and provides gear change of the transmission by rotation, and a casing that covers the transmission and the clutch and also covers the shift shaft in such a manner that part of the shift shaft projects outward to form a projecting portion. An actuator includes an output shaft, and a connecting device connects the projecting portion of the shift shaft and the output shaft together on the outside of the casing. The connecting device is detachably connected to at least one of the projecting portion of the shift shaft and the output shaft.

The saddle-type vehicle engages or disengages the clutch and provides gear change of the transmission by rotating the shift shaft. The connecting device that connects the shift shaft and the actuator can be detached from the projecting portion of the shift shaft or the output shaft of the actuator. Accordingly, even if the actuator fails, the saddle-type vehicle can be driven in a desired shift position by rotating the shift shaft with the connecting device detached from the projecting portion of the shift shaft or from the output shaft. Since the connecting device can be detached on the outside of the power unit, the connection between the actuator and the shift shaft can easily be released. Since the connecting device is disposed outside the power unit, there is no possibility of complication of the inner structure of the power unit. Moreover, the upsizing of the power unit can be prevented.

The invention enables driving of saddle-type vehicles at the failure of the actuator without complication of the structure or upsizing of the power unit.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a left side view of a motorcycle according to an embodiment of the invention.

FIG. 2 is a partially cutaway sectional view of a power unit of the invention.

FIG. 3 is a sectional view of the power unit of the invention.

FIG. 4 is an exploded perspective view of a part of a transmission of the invention.

FIG. 5 is a partial left side view of the motorcycle of the invention.

FIG. 6 is an internal schematic diagram of an actuator of the invention.

FIG. 7(*a*) is a side view of a rotating lever of the invention. FIG. 7(*b*) is a diagram of the rotating lever as viewed from the direction indicated by the arrow VIIb of FIG. 7(*a*).

FIG. 8(*a*) is a side view of a rotating arm of the invention. FIG. 8(*b*) is a diagram of the rotating arm as viewed from the direction indicated by the arrow VIIb of FIG. 8(*a*).

FIG. 9 is a side view of a rod of the invention.

FIG. 10 is a partial plan view of the motorcycle of the invention.

FIG. 11 is a perspective view of a switch box of the invention.

FIG. 12 is a partial side view of a motorcycle according to a second embodiment of the invention.

FIG. 13 is a front view of a rod according to the second embodiment of the invention.

FIG. 14(*a*) is a front view of a rod member of the invention.

FIG. 14(*b*) is a side view of the rod member.

DETAILED DESCRIPTION OF THE INVENTION

Embodiments of the invention are now described in detail with reference to the drawings.

First Embodiment

Referring to FIG. 1, a saddle-type vehicle according to the invention is a motorcycle 10. The motorcycle 10 includes a body frame 11 and a seat 16 for a rider. The motorcycle 10 is a moped. The term "moped" as used herein denotes merely the type of vehicle in terms of shape and does not limit the maximum speed, piston displacement, or size of the vehicle. The invention is not limited to a moped but may be another type of motorcycle, such as one with a fuel tank ahead of the seat, or another saddle-type vehicle such as a motor tricycle or an all-terrain vehicle (ATV).

In the following description, front, rear, right, and left denote directions from the perspective of a rider seated on seat 16. The body frame 11 includes: a steering head pipe 12; a main frame 13 extending from the steering head pipe 12 obliquely downward toward the rear; a pair of right and left seat rails 14 extending from the middle of the main frame 13 obliquely upward toward the rear; and a pair of right and left backstays 15 obliquely extending toward the upper rear from the main frame 13 and behind the seat rails 14. The backstays 15 are connected between the rear end of the main frame 13 and the middle of the seat rails 14. The steering head pipe 12 supports a front wheel 19 with a front fork 18 therebetween.

The upper part and right and left sides of the body frame 11 are principally covered with a main cover 21a and side covers 21b. The main cover 21a and the side covers 21b are herein referred to as a body cover 21.

A pair of right and left first engine brackets 22 projecting downward is provided in the middle of the main frame 13. A pair of right and left second engine brackets and a pair of right and left rear-arm brackets (both are not shown) are provided at the rear end of the main frame 13. The brackets at the main frame 13 and the like constitute part of the body frame 11.

The rear-arm brackets project downward from the rear end of the main frame 13. The rear-arm brackets have a pivot shaft 86. The pivot shaft 86 pivotally supports the front end of a rear arm 25. The rear end of the rear arm 25 supports a rear wheel 26. The rear half of the rear arm 25 is suspended by the body frame 11 with a cushion unit 27 therebetween.

The motorcycle 10 includes a front fender 31 that covers the upper and rear of the front wheel 19 and a rear fender 32 that covers the obliquely upper rear portion of the rear wheel 26. The motorcycle 10 further includes, in addition to the body cover 21, a front cowl 33 and right and left leg shields 34.

The body frame 11 supports a power unit 28 that drives the rear wheel 26. The power unit 28 includes a crankcase 35 and a cylinder 43 extending forward or obliquely upward toward the front from the crankcase 35.

Footrests 85 are disposed on the right and left of the power unit 28. The footrests 85 are supported by the crankcase 35 with a connecting rod 87 and a mounting plate 88 fixed to the connecting rod 87 therebetween.

Referring to FIGS. 2 and 3, the structure of the power unit 28 is described. The power unit 28 includes an engine 29 having a crankshaft 30, a centrifugal clutch 36, a gear-shift clutch 37 that is engaged or disengaged at gear-shift operation, and a transmission 38. While the type of the engine 29 is not limited, the engine 29 of the embodiment is a four-cycle single-cylinder engine.

As shown in FIG. 3, the centrifugal clutch 36 is mounted to the right end of the crankshaft 30. The centrifugal clutch 36 has a clutch boss fixed to the crankshaft 30 and a clutch housing (not shown). The centrifugal clutch 36 is disengaged while idling and engaged during running. In other words, the centrifugal clutch 36 is disengaged when the rotation speed of the crankshaft 30 (engine RPM) is lower than a predetermined speed and engaged when it becomes higher than the predetermined speed.

The gear-shift clutch 37 is a multiplate wet clutch, which has a clutch boss 37a and a clutch housing 37b. Here the type of the gear-shift clutch 37 is not particularly limited. The centrifugal clutch 36 has a gear 41, while the clutch housing 37b of the gear-shift clutch 37 has a gear 42. The gear 41 and the gear 42 are in engagement with each other. Thus, the clutch housing 37b of the gear-shift clutch 37 rotates with the centrifugal clutch 36 (specifically, the clutch housing of the centrifugal clutch 36).

The clutch boss 37a is mounted to a main shaft 44, so that it rotates with the main shaft 44. The clutch housing 37b is rotatably mounted to the main shaft 44. The clutch boss 37a has a plurality of friction plates 39a, while the clutch housing 37b has a plurality of clutch plates 39b. The friction plates 39a are each disposed between adjacent clutch plates 39b.

A pressure plate 37c is disposed to the right of the clutch boss 37a. The pressure plate 37c is slidable along the axis, and urged to the left by a compression spring 60. That is, the pressure plate 37c is urged in the direction in which the friction plates 39a and the clutch plates 39b are brought into pressure contact with each other. When the pressure plate 37c moves to the right against the urging force of the compression spring 60, the friction plates 39a and the clutch plates 39b are separated, so that the gear-shift clutch 37 is disengaged.

As shown in FIG. 2, there is a plurality of speed-change gears 46 around the outer periphery of the main shaft 44. A drive shaft 45, which is disposed in parallel with the main shaft 44, is fitted with a plurality of speed-change gears 47. The speed-change gears 46 on the main shaft 44 and the speed-change gears 47 on the drive shaft 45 are in engagement as appropriate.

One or both of the speed-change gears 46 and the speed-change gears 47 except selected gears is mounted in an idling state to the main shaft 44 or the drive shaft 45. Accordingly, the driving force from the main shaft 44 is transferred to the drive shaft 45 via the selected pair of speed-change gears.

The selection of the speed-change gears is performed via a shift cam 113 (refer to FIG. 4). As shown in FIG. 4, the transmission 38 includes a shift fork 111a for sliding the speed-change gears 46 along the axis of the main shaft 44 and a slide rod 112a for slidably supporting the shift fork 111a. The transmission 38 further includes a shift fork 111b for sliding the speed-change gears 47 along the axis of the drive shaft 45 and a slide rod 112b for slidably supporting the shift fork 111b. The shift cam 113 has a cam groove 113a therearound. The shift forks 111a and 111b slide along the cam groove 113a.

The shift cam 113 rotates via a ratchet mechanism 115 by the rotation of the shift shaft 70. The ratchet mechanism 115 rotates the shift cam 113 at regular intervals (angles) to regularly move the shift forks 111a and 111b, and has a reciprocal ratchet function for changing the gears one step by one step. A shift arm 116 of the ratchet mechanism 115 transfers the rotation of the shift shaft 70 and controls the stroke of the shift shaft 70 to thereby prevent the overrun of the shift cam 113. A stopper plate 117 of the ratchet mechanism 115 fixes the shift cam 113 to a predetermined position.

As shown in FIG. 3, the hollow main shaft 44 is rotatably supported by a bearing 540. In the main shaft 44, a first push rod 527, a ball 528, and a second push rod 529 are axially movably inserted, with the movement of which, the pressure plate 37c moves laterally.

The second push rod 529 has a collar 529b. A bearing 533 is disposed between the collar 529b and the pressure plate 37c. This makes the second push rod 529 not rotate but the pressure plate 37c rotate.

A nut 536a at a first end of a lever 536 is screwed on a male screw 535a of the shift shaft 70. A second end 536b of the lever 536 is in contact with a small-diameter portion 527b of the first push rod 527. The lever 536 is connected at a central supporting point 536c to a support shaft 537, and rotates about the supporting point 536c.

When the shift shaft 70 rotates, the nut 536a of the lever 536, which is screwed on the male screw 535a of the shift shaft 70, moves to the left. With the movement of the nut 536a, the lever 536 rotates, so that the second end 536b of the lever 536 pushes the first push rod 527 to the right, and thus the first push rod 527 slides to the right. The second push rod 529 is pushed to the right by the first push rod 527 via the ball 528 to slide to the right.

As the second push rod 529 slides, the pressure plate 37c is moved to the right against the urging force of the compression spring 60. As a result, the pressure contact between the friction plates 39a and the clutch plates 39b is released to disengage the gear-shift clutch 37.

Thus, the shift shaft 70 and the pressure plate 37c are connected together through the lever 536, the first push rod 527, the ball 528, and the second push rod 529, so that the pressure plate 37c moves with the rotation of the shift shaft 70. In other words, when the shift shaft 70 starts to rotate and the rotation angle of the shift shaft 70 reaches a predetermined angle (a clutch-release starting angle), the pressure plate 37c moves to the right to disengage the gear-shift clutch 37. When the shift shaft 70 further rotates to reach a predetermined angle (gear-shift start angle), the shift cam 113 rotates to start a gear-shift operation.

The crankshaft 30 is fitted at the left end with a flywheel magneto 50 as a rotor that rotates with the crankshaft 30. The flywheel magneto 50 configures the rotor of a generator 51. The rotor is not limited to the flywheel magneto 50 but may another rotor such as a flywheel.

As shown in FIG. 2, the crankcase 35 includes a first casing 52 and a second casing 53. Although not shown, the first casing 52 is composed of a plurality of casing members, and mainly covers part of the crankshaft 30, the centrifugal clutch 36, the gear-shift clutch 37, the main shaft 44, part of the drive shaft 45, and the shift cam 113. The second casing 53 covers the flywheel magneto 50. The second casing 53 is located ahead of the first casing 52 in the front-back direction of the vehicle. The second casing 53 projects outside the first casing 52 in the width direction of the vehicle (to the left in FIG. 2). Although the first casing 52 and the second casing 53 of the embodiment are separate from each other, they may be integrated into one.

As shown in FIG. 3, part of the shift shaft 70 projects out of the crankcase 35 to form a projecting portion 70a. As shown in FIG. 2, part of the drive shaft 45 also projects out of the crankcase 35. A sprocket 54 is fixed to a projecting portion 45a of the drive shaft 45. A chain 55 serving as a power transfer member is wound around the sprocket 54 and the sprocket (not shown) of the rear wheel 26. The power transfer member for transferring the driving force of the drive shaft 45 to the rear wheel 26 is not limited to the chain 55 but may be another power transfer member such as a transfer belt or a drive shaft.

As shown in FIG. 5, a chain cover 56 is disposed on a side of the chain 55 (on the front side of FIG. 5). The chain cover 56 covers the upper and lower part and the outer part of the chain 55 in the width direction. The cylinder 43 (refer to FIG. 1) of the power unit 28 is not shown in FIG. 5.

As shown in FIG. 5, the motorcycle 10 has an actuator 75 for rotating the shift shaft 70. The actuator 75 is connected to the shift shaft 70 via the connecting device 61. The structure of the actuator 75 will next be described.

As shown in FIG. 6, the actuator 75 includes a motor 77 composed of a motor body 77a and a motor shaft 77b, a worm 79 fixed to the motor shaft 77b, a worm wheel 80 engaged with the worm 79, and an output shaft 81 serving as the rotation shaft of the worm wheel 80. The actuator 75 further includes a case 76 for housing the motor 77, the worm 79, and the worm wheel 80. The case 76 is a thin case (refer to FIG. 10) that is thin along the axis of the output shaft 81. The case 76 is composed of a first case 76a and a second case 76b that can be divided from each other. The second case 76b located adjacent to the outer side of the vehicle width has a hole for the output shaft 81 to pass through, through which the output shaft 81 projects out of the case 76.

As shown in FIG. 6, the first and second cases 76a and 76b have a plurality of bolt holes 73 and 74 around the periphery thereof. The first and second cases 76a and 76b are joined together with bolts (not shown) passed through the bolt holes 73 and 74. As shown in FIG. 5, the main frame 13 and the seat rails 14 have a bracket 24. The first and second cases 76a and 76b are mounted to the bracket 24 with the bolts (not shown) passed through the bolt holes 74. The actuator 75 is disposed in the region A1 defined by the main frame 13, the seat rails 14, and the backstays 15.

As shown in FIGS. 5 and 6, the motor 77 extends in the direction perpendicular or substantially perpendicular to the width of the vehicle. Thus, the axis 77c of the motor 77 is substantially perpendicular to the width of the vehicle. The axis 77c is also the axis of the worm 79, The output shaft 81 extends in the direction perpendicular to the axis 77c. Thus, the output shaft 81 extends substantially along the width of the vehicle.

The worm gear composed of the worm 79 and the worm wheel 80 has a large reduction ratio. In this embodiment, the reduction ratio of the worm gear is set to 100 or higher.

A connecting device 61 that connects the actuator 75 and the shift shaft 70 is now described.

As shown in FIG. 5, the connecting device 61 connects the output shaft 81 of the actuator 75 and the projecting portion 70a of the shift shaft 70 on the outside of the crankcase 35 of the power unit 28. The projecting portion 70a of the shift shaft 70 is disposed at the obliquely lower rear of the flywheel magneto 50 as viewed from the side. The connecting device 61 includes a rotating lever 71 connected to the output shaft 81, a rotating arm 72 connected to the projecting portion 70a of the shift shaft 70, and a rod 63 that connects the rotating lever 71 and the rotating arm 72. The rod 63 is connected to the rotating lever 71 and the rotating arm 72 in such a manner as to tilt in the direction of the vehicle width.

In this embodiment, the rod 63 and the rotating lever 71, and the rod 63 and the rotating arm 72 are each joined together with connecting devices that connect the rod 63 to the rotating lever 71 and the rotating arm 72 in such a manner as to tilt in the direction of the vehicle width. Referring to FIGS. 7 and 8, the embodiment uses ball joints 64 as the connecting devices. Thus, one end of the rod 63 is connected to the rotating lever 71 via the ball joint 64, while the other end thereof is connected to the rotating arm 72 via the ball joint 64.

The ball joint 64 includes a cylindrical part 64a in which the tip end of the rod 63 is inserted and a ball 64b that supports the cylindrical part 64a in such a manner as to rotate 360 degrees. A nut 69 is fit on the tip end of the cylindrical part 64a to tighten the rod 63 inserted. The rod 63 is detachably connected to the ball joint 64.

Referring to FIG. 7, a substantially C-shaped first connecting portion 71b in side view is provided at the base of the rotating lever 71 (on the right in FIG. 7(a)). A fixing hole 71a in which the output shaft 81 of the actuator 75 is fit is provided in the center of the first connecting portion 71b. A bolt hole 71c for a bolt 66 is provided to the right of the fixing hole 71a. The bolt 66 fixes the first connecting portion 71b and the output shaft 81 to each other. Thus, the rotating lever 71 and the output shaft 81 are detachably joined via the bolt 66.

Referring to FIG. 8, a substantially C-shaped second connecting portion 72b in side view is provided at the base of the rotating arm 72 (on the left in FIG. 8(a)). A fixing hole 72a in which the projecting portion 70a of the shift shaft 70 is fit is provided in the center of the second connecting portion 72b. A bolt hole 72c for the bolt 66 is provided under the fixing hole 72a. The bolt 66 fixes the second connecting portion 72b and the projecting portion 70a of the shift shaft 70 to each other. Thus, the rotating arm 72 and the projecting portion 70a of the shift shaft 70 are detachably joined via the bolt 66.

As shown in FIG. 7, the rotating lever 71 is in the form of a plate extending substantially in the front-back direction. The rotating arm 72 is also in the form of a plate extending substantially in the front-back direction. The rotating arm 72 however does not extend linearly in one direction but is bent inward along the width of the vehicle from the base toward the tip end. The structures of the rotating lever 71 and the rotating arm 72 are not limited at all.

As shown in FIG. 9, the rod 63 is formed in one piece. Referring to FIG. 5, the rod 63 is disposed vertically (the "vertically" here includes not only "vertically" in the strict sense of the word but also "substantially vertically") as viewed from the side. The rod 63 extends vertically behind the flywheel magneto 50 as viewed from the side. In other words, the rod 63 passes through the side of the first casing 52 and the back of the second casing 53. The rod 63 overlaps with the sprocket 54 connected to the drive shaft 45, and also overlaps with the chain 55 in side view.

As shown in FIG. 10, the rod 63 is inclined in the vehicle width direction. Specifically, the rotating lever 71 is disposed inwardly of the rotating arm 72 in the vehicle width direction, and the rod 63 is inclined such that the upper end is disposed inwardly of the lower end in the vehicle width direction. The rod 63 is disposed inwardly of the outer end of the second casing 53 in the vehicle width direction.

As shown in FIG. 5, an inner cover 82 is provided between the rod 63 and the chain 55. The inner cover 82 is a vertically long bent plate, which partitions the rod 63 from the chain 55. The inner surface of the inner cover 82 is close to the chain 55. The position and method for fixing the inner cover 82 are not limited at all. For example, the inner cover 82 may be fixed to the crankcase 35 or a bracket (not shown) with bolts (not shown) or the like.

Referring to FIGS. 1 and 10, most of the rod 63 is covered with an outer cover 83. In this embodiment, the outer cover 83 also covers most of the rotating arm 72. The outer cover 83 also covers the side of the chain 55 together with the chain cover 56. Referring to FIG. 10, the outer cover 83 has at the upper part a recess 83a for the rod 63 to vertically pass through.

The position and method for fixing the outer cover 83 are not limited at all. For example, the outer cover 83 may be fixed to the crankcase 35, a bracket (not shown), or the chain cover 56 with a bolt 84 (refer to FIG. 1). The outer cover 83 can be removed with the side cover 21b and the actuator 75 fixed. Thus, this embodiment is constructed such that only the outer cover 83 can be removed without removing the side cover 21b and the actuator 75. The outer cover 83 may be formed in one piece or may be a combination of a plurality of cover members.

Referring to FIG. 1, the actuator 75 and the rotating lever 71 (both are not shown in FIG. 1) are covered with the side covers 21b. The outer cover 83 and the side covers 21b cover almost all the connecting device 61.

Referring to FIG. 11, the steering handle has a switch box 94 having a shift switch 95 at the left grip. The shift switch 95 is composed of a shift-up switch 95a and a shift-down switch 95b, for shifting the gear of the transmission 38 between the first to the highest speed (for example, the sixth speed) as appropriate. When the shift-up switch 95a or the shift-down switch 95b is pushed, the actuator 75 is activated to rotate the shift shaft 70 via the connecting device 61. The gear-shift clutch 37 is disengaged with the rotation of the shift shaft 70 to change the combination of the gears 46 and 47 of the transmission 38 (the combination of engaging gears) for gear-shift operation.

The motorcycle 10 can be driven in a desired shift position even if the actuator 75 fails. An example of measures to cope with trouble of the actuator 75 will now be described.

In the event of trouble of the actuator 75, the outer cover 83 is first removed. In this case, there is no need to remove the actuator 75.

Next, the connection by the connecting device 61 is released. For example, the bolt 66 (refer to FIG. 7) may be removed to detach the rotating lever 71 from the output shaft 81 of the actuator 75. The bolt 66 (refer to FIG. 8) may be removed to detach the rotating arm 72 from the projecting portion 70a of the shift shaft 70. Alternatively, the nut 69 of the ball joint 64 may be loosened to remove the rod 63 from the rotating lever 71 or the rotating arm 72. Removing the rod 63 from the rotating arm 72 or removing the rotating arm 72 from the projecting portion 70a of the shift shaft 70 is convenient because there is no need to remove the side cover 21b.

The shift shaft 70 is then forced to rotate to a desired position. The shift shaft 70 may be rotated by the rotation of the projecting portion 70a using tools. When the rotating arm 72 is in the state of being mounted to the projecting portion 70a, the shift shaft 70 may be rotated by operating the rotating arm 72 by hand or foot. As a result, the transmission 38 can be set to a desired shift position (for example, the first speed or the second speed), allowing the vehicle to drive in that shift position. The foregoing operation can be made by the rider.

A foot change pedal, which is prepared in advance, may be mounted to the projecting portion 70a of the shift shaft 70 after the turning arm 72 is removed. In this case, the gear-shift operation can be made manually, so that normal driving is possible. Depressing the change pedal can bring the gear-shift clutch 37 into disengagement.

In this embodiment, the connecting device 61 is easily removed from the projecting portion 70a of the shift shaft 70. The connecting device 61 is easily removed from the output shaft 81 of the actuator 75. Furthermore, the rod 63 is easily removed from the rotating lever 71 or the rotating arm 72. This facilitates releasing the connection between the actuator 75 and the shift shaft 70 on the outside of the power unit 28.

Accordingly, in this embodiment, even if the actuator 75 fails, the motorcycle 10 can be driven in a desired shift position by rotating the shift shaft 70 after the connection between the actuator 75 and the shift shaft 70 has been released.

According to this embodiment, since the connecting device 61 is disposed outside the power unit 28, there is no possibility of complication of the inner structure of the power unit 28 due to the presence of the connecting device 61. This also prevents the upsizing of the power unit 28. This allows the vehicle to drive when the actuator 75 fails without a complicated or upsized structure of the power unit 28.

In this embodiment, since the connecting device 61 is disposed outside, a general-purpose power unit 28 can be used. For example, this embodiment can be achieved only by disposing the actuator 75 and the connecting device 61 after the foot change pedal of a power unit (general-purpose power unit) has been removed therefrom.

Particularly, in this embodiment, the connection between the actuator 75 and the shift shaft 70 can be released with the actuator 75 fixed to the body frame 11. In other words, the connection between the actuator 75 and the shift shaft 70 can be released without removing the actuator 75. This facilitates or speeds up the release of the connection between the actuator 75 and the shift shaft 70. Although in this embodiment, the actuator 75 is fixed to the body frame 11, the actuator 75 may be fixed to the power unit 28.

In this embodiment, the connecting device 61 and the projecting portion 70a of the shift shaft 70, and the connecting device 61 and the output shaft 81 of the actuator 75 are joined together with easily detachable bolts 66. Accordingly, the rider can easily detach them with a general-purpose tool (a tool kept in the motorcycle 10 such as a wrench or a driver). The easily detachable fixing device is not necessarily the bolt 66 but may be another device such as a screw.

The arrangement of this embodiment facilitates detaching the rod 63 from the rotating lever 71 and the rod 63 from the rotating arm 72 by unfastening the nuts 69 of the ball joints 64 (refer to FIGS. 7 and 8). This facilitates releasing the connection of the connecting device 61 with a general-purpose tool.

The actuator 75 includes a worm gear composed of the worm 79 and the worm wheel 80. The high reduction ratio of the worm gear reduces the space necessary for providing a specified reduction ratio, thus reducing the size of the actuator 75. The worm gear transfers the driving force of the motor 77 to the output shaft 81, but transfers no driving force from the output shaft 81 to the motor 77. That is, the worm gear is a power transfer mechanism that does not reverse. Thus, the reverse of the motor 77 of the actuator 75 is reduced or prevented.

In this embodiment, the axis 77c of the motor 77 of the actuator 75 extends in a direction perpendicular or substantially perpendicular to the width of the vehicle. Since the axis 77c of the motor 77 extends in the direction perpendicular to the width of the vehicle, the output shaft 81 extends along the width of the vehicle. As a result, the connecting device 61 moves in the plane perpendicular to the width of the vehicle (for example, the plane along the front-back direction of the vehicle). Thus, the connecting device 61 does not protrude along the width of the vehicle with the movement, further decreasing the width of the motorcycle 10.

In this embodiment, the rod 63 extends vertically, so that the rod 63 is short in length in the front-back direction, and the necessary length of the rod 63 can be reduced.

Although the actuator 75 may be disposed at the power unit 28, the actuator 75 of the embodiment is separate from the power unit 28. Thus, the actuator 75 has high versatility of installation. Moreover, since the actuator 75 is not directly subjected to the heat or vibration from the power unit 28, the reliability and life of the actuator 75 can be improved.

According to the embodiment, the actuator 75 is disposed in the region A1 defined by the main frame 13, the seat rails 14, and the backstays 15 as viewed from the side. Thus, the region A1 can be effectively used as the installation space for the actuator 75.

According to the embodiment, since the outside of the rod 63 in the vehicle width direction is covered with the outer cover 83, the rod 63 is protected. Moreover, since the outer cover 83 also covers part of the rotating lever 71 and the rotating arm 72, the rotating lever 71 and the rotating arm 72 are also protected. Since the rotating lever 71 and the actuator 75 are covered with the side cover 21b, the actuator 75 etc. is also protected.

In this embodiment, the rod 63 and the chain 55 are partitioned by the inner cover 82. This eliminates the possibility that the rider touches the chain 55 when removing the connecting device 61, thus facilitating removal work and reducing or preventing the dirt of the rod 63 by the chain 55. Moreover, since there is no concern about interference between the rod 63 and the chain 55, the rod 63 can be brought close to the chain 55. This allows the rod 63 to be disposed more inward, thereby decreasing the width of the motorcycle 10.

The connecting device 61 is disposed outwardly of the main frame 13 in the vehicle width direction. Since the connecting device 61 is disposed outside, the connecting device 61 is easily removed.

The connecting device 61 includes the first connecting portion 71b connected to the output shaft 81 of the actuator 75 and the second connecting portion 72b connected to the projecting portion 70a of the shift shaft 70. The first connecting portion 71b is disposed inwardly of the second connecting portion 72b in the vehicle width direction. Therefore, this allows the actuator 75 to be disposed more inward, thereby decreasing the width of the motorcycle 10. Since the connecting device 61 can be released without removing the actuator 75, the connecting device 61 can easily be removed even with the actuator 75 disposed inside.

According to this embodiment, the rod 63 is connected to the rotating lever 71 and the rotating arm 72 in such a manner as to tilt in the vehicle width direction, so that the rod 63 is inclined in the vehicle width direction. This allows the actuator 75 to be disposed inside using the linearly extending rod 63. That is, the actuator 75 can be disposed inside with a simple structure.

Second Embodiment

Referring to FIGS. 12 and 13, a second embodiment is a modification of the first embodiment, in which the rod 63 of the connecting device 61 is modified.

In the second embodiment, the rod 63 is composed of a plurality of rod members that are detachably connected together. The rod 63 here is composed of a first rod member 91 and a second rod member 92.

Referring to FIGS. 14(*a*) and (*b*), the second rod member 92 has at the top a substantially U-shaped gripper 92a that is open upward. The gripper 92a has two upper and lower circular holes 92b and two upper and lower nuts 92c corresponding to the circular holes 92b. The first rod member 91 has at the lower part an inserted portion 91a to be inserted into the gripper 92a. The inserted portion 91a has two vertically long holes 91b.

As shown in FIG. 13, the first rod member 91 and the second rod member 92 are tightened by bolts 93 that pass through the circular holes 92b, the long holes 91b, and the nuts 92c. Since the inserted portion 91a has the long holes 91b, the bolts 93 can vertically slide in the long holes 91b. This allows the first rod member 91 and the second rod member 92 to be relatively moved axially, thus allowing adjustment of the length of the rod 63.

The first rod member 91 and the second rod member 92 are connected as follows: the inserted portion 91a of the first rod member 91 is first inserted into the gripper 92a of the second rod member 92; then the bolts 93 are inserted into the circular holes 92b of the gripper 92a, the long holes 91b of the inserted portion 91a, and the nuts 92c of the gripper 92a to temporarily fasten them; and the first rod member 91 and the second rod member 92 are relatively moved axially so that the entire length of the rod 63 reaches a desired length. In short, the length of the rod 63 is adjusted. After the rod 63 has reached a desired length, the bolts 93 are screwed into the nuts 92c to fix them.

Since the remaining structures are the same as those of the first embodiment, explanations thereof is omitted here.

This embodiment provides the same advantages as the first embodiment.

According to this embodiment, the rod 63 is composed of rod members 91 and 92 that can be separated from each other. The rod members 91 and 92 are joined with the bolts 93. Accordingly, a rider can unfasten the bolts 93 only with a general-purpose tool to detach the rod members 91 and 92, thus facilitating releasing the connection of the connecting device 61.

Other Embodiments

The invention is not limited to the above described embodiments but can be embodied in various forms.

In the foregoing embodiments, the shift shaft 70 is constructed of one shaft. However, the shift shaft 70 may be constructed of two or more shafts that rotate to apply and release the clutch and shift the gears of the transmission. For example, the shift shaft 70 may be branched to two first and second shafts via gears or the like in the crankcase 35, a first shaft engaging or disengaging the clutch and a second shaft shifting the gears of the transmission while synchronizing with the first shaft.

As has been described above, the invention is useful for saddle-type vehicles.

The particular embodiments of the invention described in this document should be considered illustrative, rather than restrictive. Modification to the described embodiments may be made without departing from the spirit of the invention as defined by the following claims.

The invention claimed is:

1. A saddle-type vehicle comprising:
a power unit including a transmission including a plurality of gears, a clutch arranged to be engaged or disengaged in response to a gear-shift operation of the transmission, a shift shaft arranged to engage or disengage the clutch and to provide gear change of the transmission by rotation, and a casing that covers the transmission and the clutch and also covers the shift shaft in such a manner that part of the shift shaft projects outward in a widthwise direction of the vehicle from the casing to define a projecting portion;
an actuator including an output shaft, the output shaft arranged to project outward in the widthwise direction of the vehicle from the actuator; and
a connecting device arranged to connect the projecting portion of the shift shaft and the output shaft together on an outside of the casing; wherein
the connecting device includes a rotating lever directly connected to the output shaft, a rotating arm directly connected to the projecting portion of the shift shaft, and a rod pivotally connected to the rotating lever and pivotally connected to the rotating arm such that a first rotation movement of the rotating lever causes a corresponding linear movement of the rod and the corresponding linear movement of the rod causes a corresponding second rotation movement of the rotating arm; and the actuator includes a primary drive and a power transfer mechanism interposed between the primary drive and the output shaft to transfer driving force from the primary drive to the output shaft and not to transfer driving force from the output shaft to the primary drive.

2. The saddle-type vehicle according to claim 1, further comprising a fastening device arranged to fasten the rotating arm to the projecting portion of the shift shaft or to fasten the rotating lever to the output shaft.

3. The saddle-type vehicle according to claim 1, wherein the actuator is separate from the power unit.

4. The saddle-type vehicle according to claim 3, further comprising a main frame obliquely extending to the lower rear, a seat rail obliquely extending from the main frame to the upper rear, and a backstay obliquely extending from the main frame to the upper rear, behind the seat rail, wherein
at least part of the actuator is disposed in a region defined by the main frame, the seat rail, and the backstay in side view.

5. The saddle-type vehicle according to claim 1, further comprising a detachable cover that covers the outside of at least part of the connecting device along the widthwise direction of the vehicle.

6. The saddle-type vehicle according to claim 1, wherein the power unit includes a drive shaft; and
the saddle-type vehicle includes:
a rear wheel;
a power transfer member that connects the drive shaft and the rear wheel to each other; and
a cover that partitions the connecting device and the power transfer member from each other.

7. The saddle-type vehicle according to claim 1, further comprising a main frame obliquely extending to the lower rear, wherein the connecting device is disposed outside the main frame in the vehicle width direction.

8. The saddle-type vehicle according to claim 1, wherein
a connection portion where the rotating lever is connected to the output shaft is located inside of a connection portion where the rotating arm is connected to the projecting portion of the shift shaft in the vehicle width direction.

9. The saddle-type vehicle according to claim 1, wherein
the rotating arm is located on the outside of the rotating lever in the vehicle width direction; and
the rod is connected to the rotating lever and the rotating arm in such a manner as to tilt in the vehicle width direction and is inclined in the vehicle width direction.

10. The saddle-type vehicle according to claim 1, wherein:
the power unit includes an engine and a centrifugal clutch interposed between the engine and the clutch.

11. The saddle-type vehicle according to claim 1, wherein the projecting portion is located in a position on the vehicle to mount a foot change pedal thereto in order to engage or disengage the clutch and provide the gear change of the transmission by rotation of the foot change pedal by a foot of a rider when riding the vehicle.

12. A saddle-type vehicle comprising:
a power unit including a transmission including a plurality of gears, a clutch arranged to be engaged or disengaged at a gear-shift operation of the transmission, a shift shaft arranged to engage or disengage the clutch and to provide gear change of the transmission by rotation, and a casing that covers the transmission and the clutch and also covers the shift shaft in such a manner that part of the shift shaft projects outward in a widthwise direction of the vehicle from the casing to define a projecting portion;
an actuator including an output shaft, the output shaft arranged to project outward in the widthwise direction of the vehicle from the actuator; and
a connecting device arranged to connect the projecting portion of the shift shaft and the output shaft together on the outside of the casing; wherein
the connecting device includes a plurality of detachable connecting members including a rotating lever fixedly connected to the output shaft, a rotating arm fixedly connected to the shift shaft, and a rod pivotally connected to the rotating lever and pivotally connected to the rotating arm; and the actuator includes a primary drive and a power transfer mechanism interposed between the primary drive and the output shaft to transfer driving force from the primary drive to the output shaft and not to transfer driving force from the output shaft to the primary drive.

13. The saddle-type vehicle according to claim 12, wherein the power unit is mounted to a vehicle main body;
the actuator is fixed to the vehicle main body or the power unit; and
the connecting members can be detached from each other while the actuator is fixed to the vehicle main body.

14. The saddle-type vehicle according to claim 12, further comprising a fastening device arranged to fasten the rotating lever to the output shaft, the rod to the rotating lever, the rod to the rotating arm, or the rotating arm to the projecting portion of the shift shaft.

15. The saddle-type vehicle according to claim 12, wherein the projecting portion is located in a position on the vehicle to mount a foot change pedal thereto in order to engage or disengage the clutch and provide the gear change of the transmission by rotation of the foot change pedal by a foot of a rider when riding the vehicle.

16. A saddle-type vehicle comprising:
a power unit including a transmission including a plurality of gears, a clutch arranged to be engaged or disengaged in response to a gear-shift operation of the transmission, a shift shaft arranged to engage or disengage the clutch and to provide gear change of the transmission by rotation, and a casing that covers the transmission and the clutch and also covers the shift shaft in such a manner that part of the shift shaft projects outward in a widthwise direction of the vehicle from the casing to define a projecting portion;
an actuator including an output shaft, the output shaft arranged to project outward in the widthwise direction of the vehicle from the actuator; and
a connecting device arranged to connect the projecting portion of the shift shaft and the output shaft together on an outside of the casing; wherein
the connecting device includes a rotating lever directly connected to the output shaft, a rotating arm directly connected to the projecting portion of the shift shaft, and a rod pivotally connected to the rotating lever and pivotally connected to the rotating arm such that a first rotation movement of the rotating lever causes a corresponding linear movement of the rod and the corresponding linear movement of the rod causes a corresponding second rotation movement of the rotating arm; and
the actuator includes a motor, a worm driven by the motor, and a worm wheel that engages with the worm to rotate the output shaft.

17. The saddle-type vehicle according to claim 16, wherein the motor extends in the direction perpendicular to the widthwise direction of the vehicle.

* * * * *